United States Patent [19]

Kuwabara et al.

[11] Patent Number: 4,624,622
[45] Date of Patent: Nov. 25, 1986

[54] FAIL-SAFE SYSTEM FOR A REVERSIBLE PUMP-TURBINE APPARATUS

[75] Inventors: Takao Kuwabara; Keitaro Takiguchi, both of Hitachi, Japan

[73] Assignee: Hitachi, Ltd., Tokyo, Japan

[21] Appl. No.: 554,075

[22] Filed: Nov. 21, 1983

[30] Foreign Application Priority Data

Nov. 20, 1982 [JP] Japan ................................ 57-204406

[51] Int. Cl.[4] ...................... F01D 17/00; F01D 21/14; F15B 9/02
[52] U.S. Cl. ........................................ 415/14; 415/51; 415/500; 91/32; 91/410
[58] Field of Search ................. 415/1, 14, 51, 48, 500, 415/40; 137/38, 67, 69; 91/20, 32, 410

[56] References Cited

U.S. PATENT DOCUMENTS

| | | | |
|---|---|---|---|
| 3,635,020 | 1/1972 | Mahlmann | 91/32 X |
| 3,802,318 | 4/1974 | Sibbald | 91/32 X |
| 3,813,990 | 6/1974 | Coppola et al. | 91/20 X |
| 4,028,510 | 6/1977 | Yamaura et al. | 137/38 X |

Primary Examiner—Robert E. Garrett
Assistant Examiner—Joseph M. Pitko
Attorney, Agent, or Firm—Antonelli, Terry & Wands

[57] ABSTRACT

A fail-safe system is used in a control unit for opening and closing guide vanes of a pump-turbine apparatus operable in both of pump operation mode and turbine operation mode. The fail-safe system has a wire carried by a rotatable sheave adapted for transmitting an information concerning an opening degree of the guide vanes, a weight suspended from one end of the wire, an operation rod disposed below and in alignment with the weight in the direction of action of the force of gravity, and a change-over valve adapted to be switched by the operation rod. When the wire is cut off accidentally, the weight drops onto the operation rod to depress the latter to switch the change-over valve so that a servomotor is switched to make the guide vanes close at predetermined rates of change of the opening degree in respective operation modes.

6 Claims, 4 Drawing Figures

FAIL-SAFE SYSTEM FOR A REVERSIBLE PUMP-TURBINE APPARATUS

BACKGROUND OF THE INVENTION

Field of the Invention

The present invention relates to a fail-safe system in a control unit for a reversible pump-turbine apparatus.

SUMMARY OF THE INVENTION

A reversible pump-turbine apparatus generally has two operation modes, i.e. turbine operation mode and pump operation mode. These operation modes are repeated alternately. Accordingly, the water flows through the reversible pump-turbine apparatus in the opposite flow directions corresponding to the two operation modes, i.e. a flow direction in the pump operation and a flow direction in the turbine operation. Each time the operation mode of the pump-turbine apparatus is changed, the pump-turbine apparatus repeats the start and stop operations thereof alternately, so that a phenomenon called "water hammering" takes place in a water passage communicating with the pump-turbine apparatus. This undesirable phenomenon causes a serious problem to the reversible pump-turbine apparatus, particularly to a high-head reversible pump-turbine apparatus. Namely, when guide vanes in the high-head reversible pump-turbine apparatus are closed linearly in the turbine operation mode thereof, a pressure in the water passage is increased to an abnormally high level, due to S-shaped curve characteristic $Q_1$ vs $N_1$ (where $Q_1$ is $Q/\sqrt{H}$ and $N_1$ is $N/\sqrt{H}$, where Q, H, and N are defined as a discharge, a net head, and a rotating speed, respectively) peculiar to such apparatus, to cause a danger of generation of an extreme stress in the guide vanes and/or water passage conduits.

In order to avoid this danger, the reversible pump-turbine apparatus is usually provided with a system for changing a maximum vane closing speed. This system is adapted to automatically change the maximum vane closing speed in accordance with the opening degree of the guide vanes. The number of steps of the speed changing operations and the timing of such changing are determined suitably in accordance with the capacities or scales of the pump-turbine apparatus and the equipments associated therewith.

Generally, the guide vanes are actuated by a servo-motor having a hydraulic cylinder and a piston associated therewith. A translational displacement of the servo-motor piston proportionally corresponds to the opening degree of the guide vane. The translational movement of the piston is fed back to the changing system through a communication wire which is connected at its one end to the piston. Namely, an information concerning the opening degree of the guide vanes is transmitted to a control unit for the reversible pump-turbine apparatus, i.e. the guide vane closing speed changing system through the communication wire.

An object of the invention is to provide a fail-safe system which can safely operate the vane closing speed changing system even in case of a trouble in the communication wire.

The above and other objects, features and advantages of the invention will become clear from the following description of the preferred embodiment taken in conjunction with the accompanying drawings.

DESCRIPTION OF THE PRIOR ART

Figure 1:
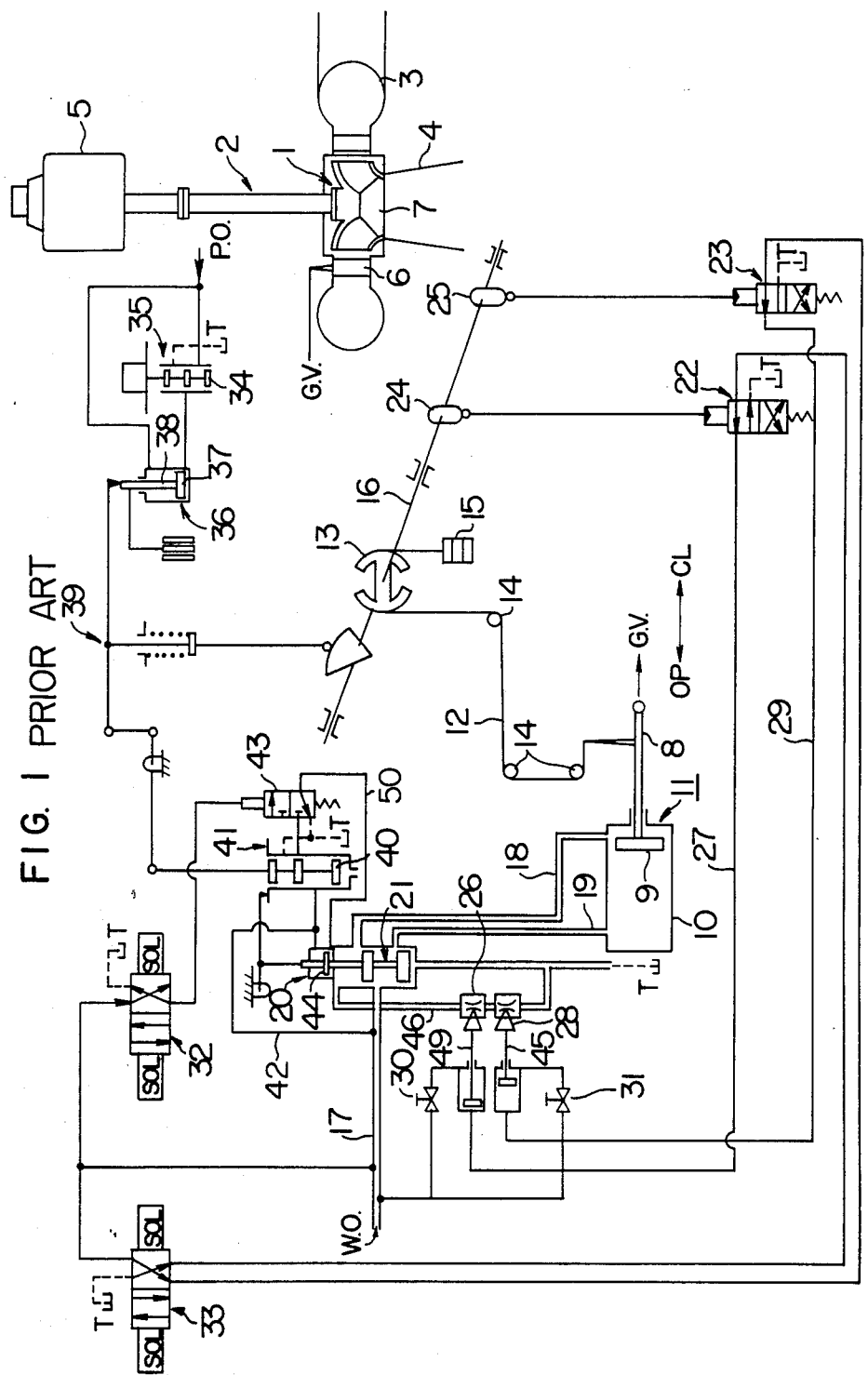
FIG. 1 is a schematic diagram of a pump-turbine apparatus incorporating a conventional guide vane closing speed changing system.

Referring first to FIG. 1, a reference numeral 1 designates a runner incorporated within a pump-turbine apparatus 2. In the turbine operation mode of this pump-turbine apparatus, e.g. in the day time, water is introduced from a higher portion through a first water passage conduit 3 into the runner 1 and is then discharged to a lower portion through a second water passage conduit 4, so that a mechanical energy possessed by the water is converted into and taken out as an electric energy by means of a motor-generator 5. To the contrary, in the pump operation mode of the pump-turbine apparatus, e.g. in the night time, the runner 1 is driven by the motor-generator 5 which is energized by an external power supply so that the water reservoired in the lower portion is pumped up to the higher portion through the second water passage conduit 4 and the first water passage conduit 3.

A reference numeral 6 designates a series of guide vanes which are arranged in a circumferential direction so as to substantially surround the runner 1. A water flow introduced into a runner chamber 7 of the apparatus 2 is changed in accordance with the opening degree of the guide vanes 6. The opening degree of the guide vanes (O.D.) is directly operated by means of a translational movement of a piston rod 8 of a piston 9 with which a cylinder 10 cooperates to form a servo-motor 11. A communication wire 12 is fixed at its one end to the piston rod 8, which is connected to a return sheave 13 through intermediate sheaves 14. A tension weight 15 is connected to the other end of the communication wire 12. The return sheave 13 is rigidly attached to a shaft 16. The translational movement of the piston rod 8 is transferred to a rotational motion of the shaft 16 through the communication wire 12.

In order to drive the piston 9, a pressurized working oil (W.O.) from a supply conduit 17 is distributed into a conduit 18 for pulling the piston rod 8 or to a conduit 19 for pushing the piston rod 18 through a main distributing valve 20 incorporating therein a distributing valve spool 21.

Reference numerals 22 and 23 designate changeover valves for changing the closing speed of the guide vanes in the pump operation mode and in the turbine operation mode, respectively. The timing of change of closing speed is determined by timing cams 24 or 25 fixed to the shaft 16. The closing speed of the guide vanes in the pump operation mode is changed by means of a throttling of a drain conduit 46 by a throttle valve 26 adapted to be driven by the working oil passing through a conduit 27, while the closing speed of the guide vanes in the turbine operation mode is changed by means of a throttling of the drain conduit 46 by a throttle valve 28 adapted to be driven by the working oil passing through a conduit 29. Numerals 30 and 31 designate stop valves.

The illustrated pump-turbine apparatus operates as follows.

When a turbine operation mode is required, a solenoid valve 32 for changing between starting and stopping of the pump-turbine apparatus 2 is switched to a position opposite to the illustrated position, and a solenoid valve 33 for changing between turbine operation mode and pump operation mode is set at the illustrated position. Subsequently, a spool 34 incorporated in a primary distributing valve 35 is lifted up so that a pressurized pilot oil (P.O.) is delivered to a pilot servo-motor 36. The piston 37 incorporated in the servo-motor 36 operates, due to a difference between the working areas of the opposite surfaces of the piston 37 of which the pressurized pilot oil (P.O.) is applied, so as to push a piston rod 38 connected thereto. A movement of the piston rod 38 is then transmitted through a link mechanism 39 to a distributing valve spool 40 incorporated in a secondary distributing valve 41 thereby to drive it. Consequently, the pressurized working oil from a conduit 42 is delivered to the main distributing valve 20 through the distributing valve 41 and a valve 43 for shutting down the pump-turbine apparatus switched in a position opposite to the illustrated position. The pressurized working oil from the conduit 42 is also delivered directly to the main distributing valve 20. Due to the difference between the working areas of the opposite surfaces of a spool portion 44 of the distributing spool 21 on which the pressurized working oil is applied, the spool 21 is moved upwardly as viewed in the drawing. Consequently, the working oil from the conduit 17 is delivered through the distributing valve 20 and the conduit 18 to the servo-motor 11 to pull the piston rod 8, so that the guide vanes are opened. The pulling movement of the piston rod 8 is transmitted through the communication wire 12 and the return sheave 13 to the shaft 16 thereby to rotate the latter. In the preceding description, the primary distributing valve 35 and the pilot servo-motor 36 constitute first stage oil power amplifier, the distributing valve 41 and the spool portion 44 of the distributing spool 21 constitute second stage oil power amplifier and the main distributing valve 20 and the servo-motor 11 constitute the third stage oil power amplifier. The first stage oil power amplifier is provided with a feedback provision including the transducer attached to the piston 37 in order to give an electrical feedback signal to the governor regulator not shown in the figure. The second stage oil power amplifier is provided with a feedback floating lever on the top of the main distributing valve 20 in order to give a feedback movement to the bushing of the secondary distributing valve 41. The third stage oil power amplifier is provided with a feedback connection which is made of communication wire 12, intermediate sheaves 14 return sheave 13, shaft 16, sheave cam attached to the shaft 16, cam follower rod, link mechanism 39 and the second stage power amplifier. Owing to the respective feedback provision the three oil power amplifiers can be stabilized at their desired position respectively. During the operation of the pump-turbine apparatus in the turbine operation mode, the solenoid valve 33 is energized to keep the illustrated position, so that the pressurized working oil is applied to the change-over valve 23. When the guide vanes are fully closed, the change-over valve 23 is held in the illustrated position by an urging force exerted by the cam 25 so that the working oil is supplied to the throttle valve 28. To the contrary, as the shaft 16 is rotated to open the guide vanes, the urging force due to the cam 25 is released, so that the change-over valve 23 is switched to a position opposite to the illustrated position by the force of a spring associated with the valve 23. Consequently, the piston rod 45 of the throttle valve 28 is pulled to fully open it. Therefore, both throttle valves 26 and 28 are held in the full open positions to directly and smoothly connect the drain conduit 46 to an oil reservoir T.

In case of an emergency stop of the pump-turbine apparatus during operation in the turbine operation mode, the solenoid valve 32 is energized and switched to the illustrated position. Consequently, a rapid stopping valve 43 is switched to the illustrated position by an urging force of a spring associated therewith, and the working oil which has been applied to one end surface of the spool portion 44 of the distribution spool 21 is drained to the oil reservoir T through a conduit 50, so that the spool 21 is moved downwardly as viewed in the drawing. Consequently, the working oil from the conduit 17 is delivered to the servo-motor 11 through the main distributing valve 20 and the conduit 19. The conduit 18 communicates with the oil reservoir T through the main distributing valve 20 and the drain conduit 46, so that the piston 9 is rapidly pressurized to push the piston rod 8 to close the guide vanes rapidly.

As the guide vanes are closed to a certain degree and the operating shaft is also rotate a certain degree, the change-over valve 23 is switched by the cam 25 to the illustrated position, so that the working oil from the solenoid valve 33 is delivered to the piston rod 45 through the change-over valve 23 to permit the throttle valve 28 to throttle the drain conduit 46. As a result, the working oil drained from the servo-motor 11 through the drain conduit 46 is restricted to slow down the pulling movement of the piston rod 8, so that the guide vanes are slowly closed to the full close position. It is, therefore, possible to relieve the undesirable water hammering in the water passage conduit and, hence, any abnormal water pressure rise which will, for otherwise, be caused by the water hammering is also avoided.

When the pump-turbine apparatus is required to be operated in the pump operation mode, the solenoid valve 33 is switched to a position opposite to the illustrated position. The operations of respective elements and the process of operation are materially identical to those described hereinbefore, except that the change-over valve 22, cam 24 and the throttle valve 26 are used in place of the change-over valve 23, cam 25 and the throttle valve 28, respectively.

Figure 2:
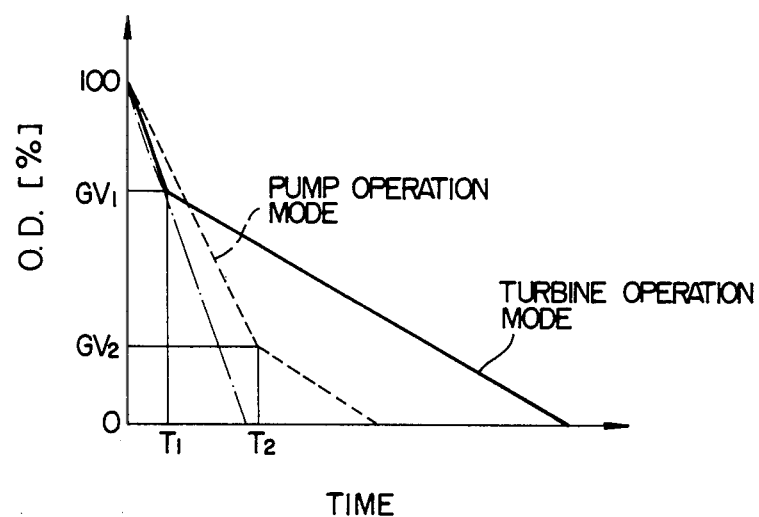
FIG. 2 shows a change of the closing rate of the guide vanes incorporated in the pump-turbine apparatus as shown in FIG. 1.

The change of the opening degree of the guide vanes in the turbine operation mode is shown by full line in FIG. 2. The opening degree (O.D.) of the guide vanes is firstly changed rapidly from 100% to $GV_1$ (from time 0 to time $T_1$). Thereafter, the opening degree is gradually decreased from $GV_1$ to 0%. The change of the opening degree in the pump operation mode is shown by broken lines. In this case, the opening degree (O.D.) is rapidly decreased from 100% to $GV_2$ (from time 0 to time $T_2$). Thereafter, the guide vanes are closed slowly to full close position, i.e. to 0% opening degree. The time for rapid closing of the guide vanes in the pump operation mode is longer than that in the turbine operation mode. This is because the possibility of occurrence of the water hammering is smaller in the pump operation mode than in the turbine operation mode, and because such rapid closing of the guide vanes is required in order to stop the pump-turbine apparatus without any reversal thereof.

The above mentioned arrangement involves a possibility of troubles such as a cutting off of the communication wire portion between the piston rod 8 and the return sheave 13, disconnection of the communication wire 12 from a joint portion between the piston rod 8 and the communication wire 12, and so forth. If such a trouble takes place after the energization of the solenoid valve 32 for an emergency stop of the pump-turbine apparatus in the turbine operation mode, the return sheave 13 and the shaft 16 are undesirably rotated by the weight 15 to represent the full-opening position of the guide vanes regardless of the movement of the piston rod 8. Consequently, the cam 25 fails to act on the changeover valve 23 and the working oil is not supplied to the throttle valve 28, so that a restriction fails in the drain conduit 46. Therefore, the piston 9 constantly pushes the piston rod 8, so that the guide vanes are closed linearly and rapidly to the full close position as shown by one-dot-and-dash line shown in FIG. 2. As a result, the water pressure in the water passage conduit is increased abnormally, and occasionally a serious accident is incurred, such as a breakdown of the passage conduit.

Under this circumstance, the present invention aims as its primary object at overcoming the above-described problem of the prior art.

A preferred embodiment of the invention will be described hereinunder with reference to the accompanying drawings in which the same reference numerals are used to designate the same parts or members as those incorporated in the conventional arrangement shown in FIG. 1.

DESCRIPTION OF THE PREFERRED EMBODIMENT

Figure 3:
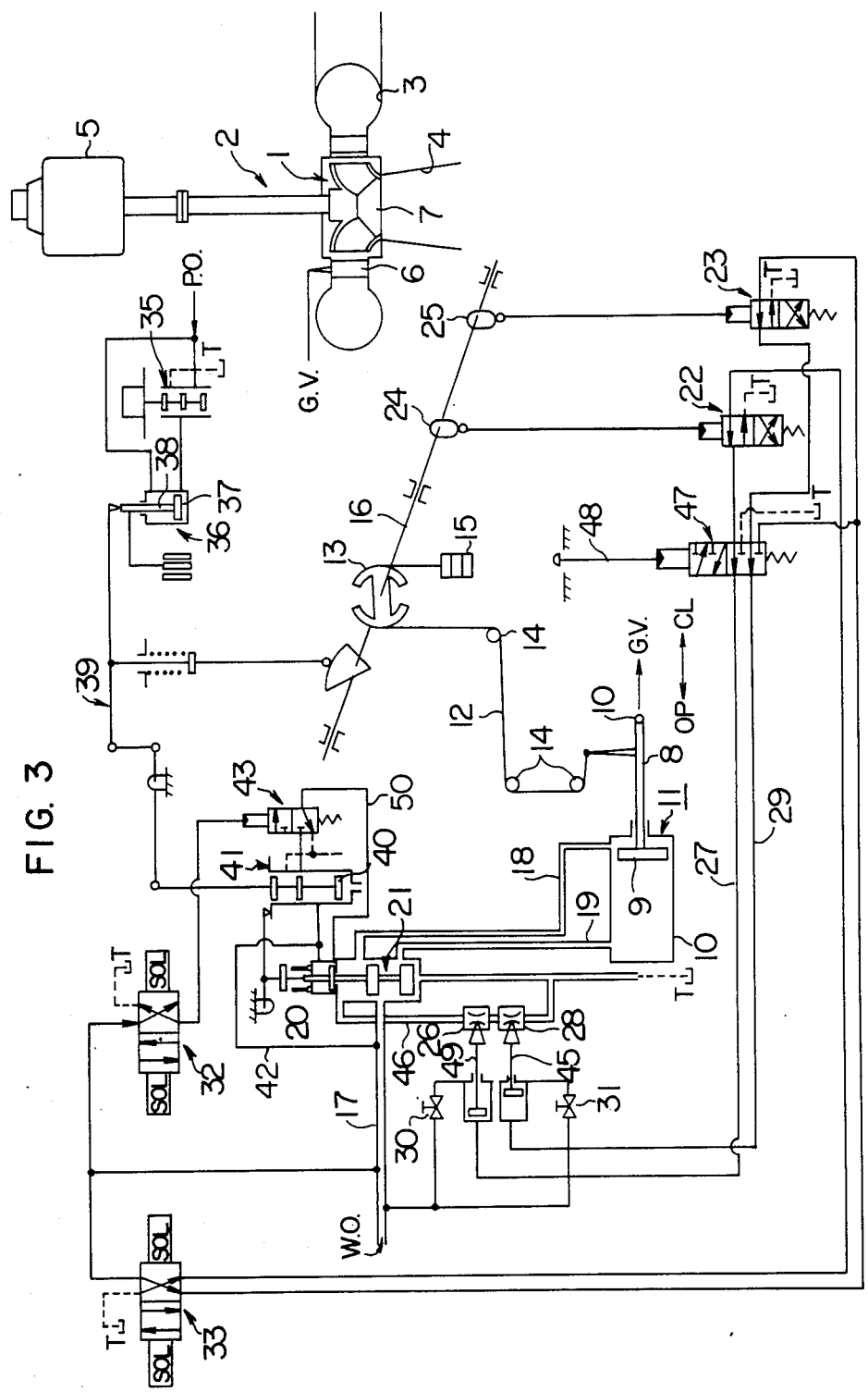
FIG. 3 is a schematic diagram of a pump-turbine apparatus incorporating a guide vane closing speed changing system employing a fail-safe system in accordance with the invention.

FIG. 3 shows a pump-turbine apparatus having a fail-safe system in accordance with the invention. This pump-turbine apparatus is discriminated from the known apparatus shown in FIG. 1 by the provision of a fail-safe change-over valve 47 disposed in the conduits 27 and 29 through which the throttle valves 26 and 28 are communicated with the change-over valves 22 and 23. The fail-safe valve 47 is provided with an operation rod 48 which is adapted to switch the fail-safe valve 47 upon contact with the tension weight 15 when the tension weight 15 is dropped accidentally owing to the cutting off of the communication wire 12 as well as to the defective joint portion between the piston rod 8 and the communication wire 12.

In the normal operation of the pump-turbine apparatus in the turbine or pump operation mode, the fail-safe valve 47 is held at the illustrated position by the force of a spring associated therewith. In this state, the oil conduit circuit is equivalent to that of the conventional arrangement shown in FIG. 1.

Figure 4:
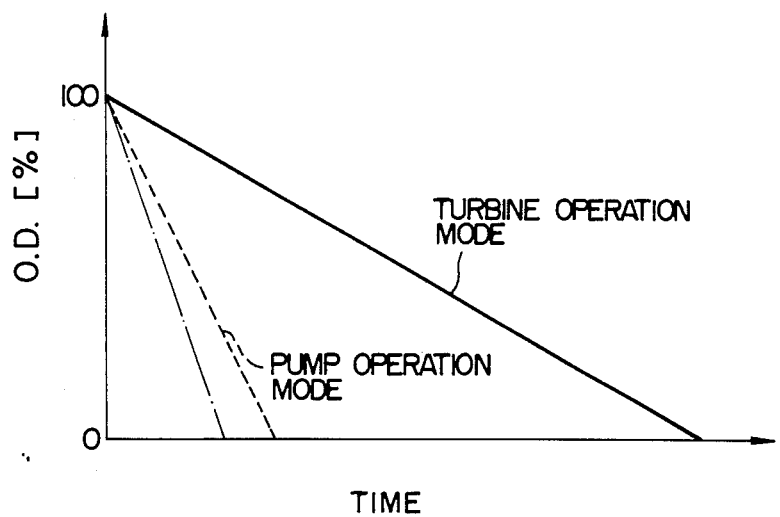
FIG. 4 shows a change of the guide vane closing rate of the guide vanes incorporated in the pump-turbine apparatus shown in FIG. 3.

If a portion of the communication wire 12 between the sheave 13 and the piston rod 8 is cut off accidentally after the energization of the solenoid valve 32, and the tension weight 15 drops down to collide with the operation rod 48 to depress the latter, the fail-safe valve 47 is switched to a position opposite to the illustrated position without any delay. Consequently, the working oil from the solenoid valve 33 is delivered to the throttle valve 28 not through the change-over valve but through the fail-safe valve 47. Consequently, the drain conduit 46 is restricted by the throttle valve 28 to limit the working oil flow discharged from the servo-motor 11 through the conduit 18 and the main distributing valve 20, thereby to permit the piston rod 8 to be pushed out slowly. Thus, in this case, the guide vanes are closed from the full open position to the full close position linearly at a small rate as shown by full line in FIG. 4. The change of the opening degree of the guide vane when the communication wire 12 is accidentally cut off in the conventional arrangement, which is represented by one-dot-and-dash line in FIG. 2, is also represented by one-dot-and-dash line in FIG. 4. As will be clearly seen from FIG. 4, this embodiment of the fail-safe system of the invention can slowly and linearly close the guide vanes in the event of a trouble such as the cutting off of the communication wire, so that the undesirable water hammering can be avoided and, hence, a resultant abnormal pressure rise in the water passage conduit is also avoided to prevent serious accident such as breakdown of the conduit.

In the pump operation mode, this embodiment of the fail-safe system operates as follows when the communication wire 12 is accidentally cut off or disconnected from the joint portion between the piston rod 8 and the communication wire 12 after energizing of the solenoid valve 32 for an emergency stop of the pump-turbine apparatus.

When the tension weight 15 accidentally drops to depress the operation rod 48 similarly to the manner described in connection with the turbine operation mode, the fail-safe valve 47 is switched to take a position opposite to the illustrated position without delay, so that the conduit 27 is brought into communication with the oil reservoir T. Consequently, the piston rod 49 of the throttle valve 26 is withdrawn by the working oil through the stop valve 30 thereby to allow the throttle valve 26 to open the drain conduit 46 fully. As a result, the piston 9 smoothly pushes the piston rod 8, and the guide vanes are rapidly and linearly moved from the full-open position to the full close position as shown by broken line in FIG. 4. Consequently, the undesirable reversing of the runner 1, which is the most serious accident in case of a trouble in the pump operation mode, is avoided safely.

To sum up, in the event of a failure such as a cutting off or disconnection of the communication wire when there is a demand for an emergency stop of the pump-turbine apparatus, the guide vanes are rapidly and linearly closed when the apparatus is operating in the pump operation mode, whereas, when the apparatus is operating in the turbine operation mode, the guide vanes are slowly and linearly moved to the full close position. It is, therefore, possible to prevent the serious accident such as reversing of the pump-turbine apparatus which may occur in the event of the failure during the operation in the pump operation mode, as well as abnormal pressure rise in the water passage conduit which may occur in case of the failure during the operation in the turbine operation mode.

As has been described, according to the invention, it is possible to avoid damaging of the pump-turbine apparatus even when a trouble or failure in the control unit for the guide vanes of a pump-turbine apparatus. It is to be noted also that this remarkable effect can be attained without incurring substantial rise of the cost and requiring any change in the size and or the number of conventionally used members, merely by an addition of some simple mechanical elements.

Although the invention has been described through specific terms, it is to be noted that the described embodiment is not exclusive and various changes and modifications may be imparted thereto without departing from the scope of the invention which is limited solely by the appended claims.

What is claimed is:

1. A fail-safe system for use in a pump-turbine apparatus of the type having a runner adapted to operate in pump operation mode and turbine operation mode, a working chamber surrounding said runner, a series of guide vanes for controlling a water flow coming into said chamber, a servo-motor adapted to drive said guide vanes to change an opening degree thereof, and means for selectively supplying said servo-motor with pressurized liquid, said fail-safe system comprising:

means for setting different rates of change of opening degree of said guide vanes for respective operation modes;

means for determining, in accordance with the opening degree of said guide vanes, timing at which the rate of change of the opening degree of said guide vanes is changed; and means for transmitting an information representing the opening degree of said guide vanes to said determining means;

wherein the improvement comprises:

means for detecting a trouble in said transmitting means and to generate a signal in accordance with said trouble; and means for setting rates of change of the opening degree of said guide vanes for respective operation modes in accordance with said signal from said detecting means.

2. A fail-safe system for use in a pump-turbine apparatus of the type having a runner adapted to operate in pump operation mode and turbine operation mode, a working chamber surrounding said runner, a series of guide vanes for controlling a water flow coming into said chamber, a servo-motor adapted to drive said guide vanes to change an opening degree of thereof, and means for selectively supplying said servo-motor with pressurized liquid, said fail-safe system comprising:

valve means for setting different rates of change of opening degree of said guide vanes for respective operation modes;

cam means for determining, in accordance with the opening degree of said guide vanes, timing at which the rate of change of the opening degree of said guide vanes is changed; and wire means for transmitting an information representing an opening degree of said guide vanes to said determiniing cam means;

wherein the improvement comprises:

means for detecting a trouble in said wire means and to generate a signal in accordance with said trouble; and valve means for setting rates of change of the opening degree of said guide vanes for respective operation modes in accordance with said signal from said detecting means.

3. A fail-safe system according to claim 2, wherein said detecting means include a weight connected to one end of said wire means, and an operation rod disposed below and in alignment with said weight in the direction of action of the force of gravity, said operation rod being adapted to switch said valve means when said weight has dropped to collide with said operation rod.

4. A fail-safe system for use in a pump-turbine apparatus of the type having a runner adapted to operate in pump operation mode and turbine operation mode, a working chamber surrounding said runner, a series of guide vanes for controlling a water flow coming into said chamber, a servo-motor adapted to drive said guide means for selectively supplying said servo-motor with pressurized liquid, said fail-safe system comprising;

valve means setting different rates of change of opening degree of said guide vanes for respective operation modes;

throttle valve means operatively associated with and downstream from said setting valve means;

cam means for determining, in accordance with the opening degree of said guide vanes, timing at which the rate of change of the opening degree of said guide vanes is changed; and wire means for transmitting an information representing an opening degree of said guide vanes to said determining cam means;

wherein the improvement comprises:

means for detecting a trouble in said wire means and to generate a signal in accordance with said trouble; and switch valve means being operative on receipt of said signal from said detecting means, said switch valve means disposed between said setting valve means and said throttle valve means for controlling said throttle valve means to set rates of change of the opening degree of said guide vanes for respective operation modes independent of conditions of said setting valve means.

5. A fail-safe system according to claim 4, wherein said detecting means include a weight connected to one end of said wire means, and an operation rod disposed below and in alignment with said weight in the direction of action of the force of gravity, said operation rod being adapted to switch said switch valve means when said weight has dropped to collide with said operation rod.

6. A fail-safe system according to claim 4, wherein when the trouble occurs in the pump-turbine apparatus during pump operation mode, the guide vanes are closed rapidly and linearly, and when the trouble occurs during turbine operation mode, the guide vanes are closely less rapidly but still linearly.

* * * * *